United States Patent
Susnow et al.

(10) Patent No.: US 7,190,667 B2
(45) Date of Patent: Mar. 13, 2007

(54) LINK LEVEL PACKET FLOW CONTROL MECHANISM

(75) Inventors: Dean S. Susnow, Portland, OR (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 09/842,019

(22) Filed: Apr. 26, 2001

(65) Prior Publication Data

US 2002/0159385 A1    Oct. 31, 2002

(51) Int. Cl.
*G01R 31/08* (2006.01)

(52) U.S. Cl. ........................ 370/229; 370/412

(58) Field of Classification Search ............... 370/229, 370/230, 235, 236, 232, 335.21, 335.42, 370/337.71, 412, 413, 419, 429, 389, 409, 370/252, 253, 231, 234; 709/224, 236; 710/51–56
See application file for complete search history.

(56) References Cited

U.S. PATENT DOCUMENTS

| | | | | |
|---|---|---|---|---|
| 5,633,867 A * | 5/1997 | Ben-Nun et al. | ............ | 370/399 |
| 5,825,748 A * | 10/1998 | Barkey et al. | ............... | 370/236 |
| 6,148,381 A * | 11/2000 | Jotwani | ....................... | 711/158 |
| 6,188,698 B1 * | 2/2001 | Galand et al. | ............... | 370/412 |
| 6,208,661 B1 * | 3/2001 | Marshall | ...................... | 370/412 |
| 6,347,337 B1 * | 2/2002 | Shah et al. | .................. | 709/224 |
| 6,570,850 B1 * | 5/2003 | Gutierrez et al. | ........... | 370/231 |
| 6,594,701 B1 * | 7/2003 | Forin | ......................... | 709/232 |
| 6,657,962 B1 * | 12/2003 | Barri et al. | .................. | 370/235 |
| 6,678,782 B1 * | 1/2004 | Aydemir et al. | ............ | 710/316 |
| 6,721,806 B2 * | 4/2004 | Boyd et al. | .................. | 719/312 |
| 6,724,779 B1 * | 4/2004 | Alleyne et al. | ............. | 370/517 |
| 6,725,296 B2 * | 4/2004 | Craddock et al. | ............. | 710/52 |
| 6,745,353 B2 * | 6/2004 | Susnow et al. | ............. | 714/706 |
| 6,747,949 B1 * | 6/2004 | Futral | ......................... | 370/231 |
| 6,747,997 B1 * | 6/2004 | Susnow et al. | ............. | 370/509 |
| 6,751,235 B1 * | 6/2004 | Susnow et al. | ............. | 370/503 |
| 6,757,348 B1 * | 6/2004 | Vila et al. | .................... | 375/372 |
| 6,766,467 B1 * | 7/2004 | Neal et al. | ...................... | 714/5 |
| 6,775,719 B1 * | 8/2004 | Leitner et al. | ................ | 710/33 |
| 6,778,548 B1 * | 8/2004 | Burton et al. | ............... | 370/429 |
| 6,789,143 B2 * | 9/2004 | Craddock et al. | ............. | 710/54 |

* cited by examiner

*Primary Examiner*—Huy D. Vu
*Assistant Examiner*—Toan D. Nguyen
(74) *Attorney, Agent, or Firm*—Schwegman, Lundberg, Woessner & Kluth, P.A.

(57) ABSTRACT

Some embodiments of the present invention include data network comprising a host system having a host-fabric adapter; at least one remote system; a switch fabric which interconnects said host system via said host-fabric adapter to said remote system along different physical links for data communications; and at least one communication port provided in the host-fabric adapter of the host system including a set of transmit and receive buffers capable of sending and receiving data packets concurrently via respective transmitter and receiver at an end of a physical link, via the switched fabric, and a flow control mechanism utilized to prevent loss of data due to receive buffer overflow at the end of the physical link. Other embodiments are described and claims.

25 Claims, 10 Drawing Sheets

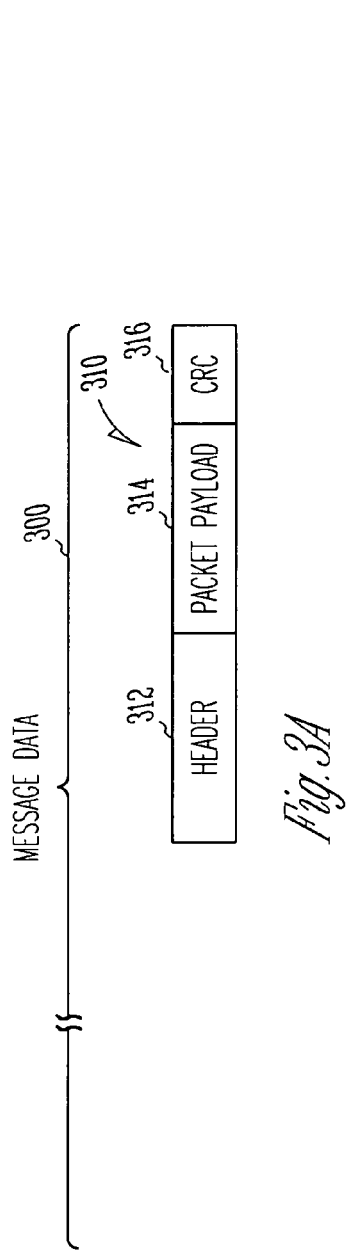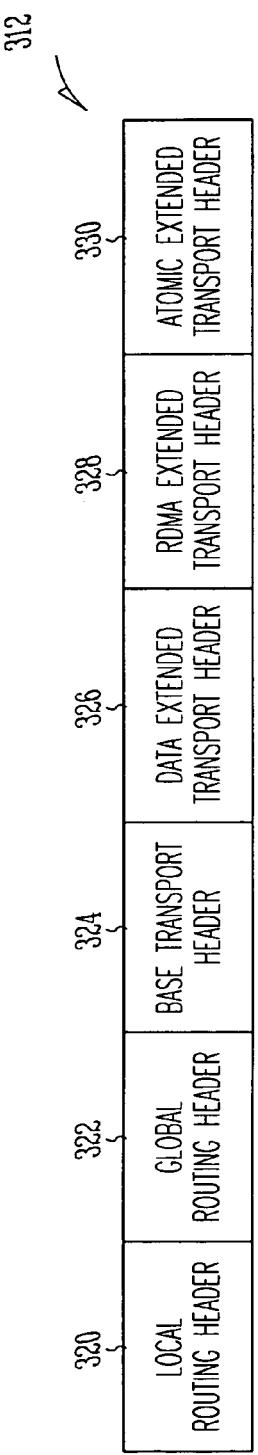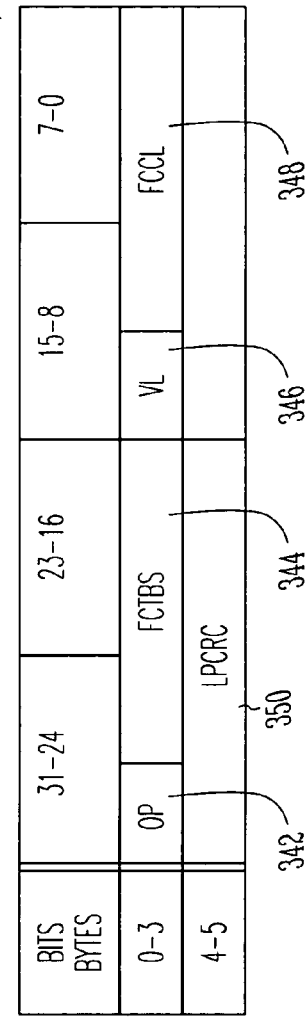

LINK LEVEL PACKET FLOW CONTROL MECHANISM

TECHNICAL FIELD

The embodiments of the present invention relate to data transfer interface technology in a data network, and more particularly, relates to a link level packet flow control mechanism utilized to prevent loss of data packets due to receive buffer overflow at either end of a transmission link (a full duplex transmission path between any two network fabric nodes, such as channel adapters installed at host systems) in such a data network.

BACKGROUND

Computer input/output (I/O) performance has become crucial to applications today because of the use of the Internet, intranets, and extranets. Key applications deployed in most Information Technology (IT) enterprises are typically predicated upon I/O subsystem performance in handling key I/O tasks to deliver data to and from computer's main CPU. These applications may include all Internet applications ranging from Web severs to Internet-based e-commerce and TCP/IP network handling, mail and messaging, on-line transaction processing, and key packaged decision-support applications. Other IT infrastructure changes have also increased the burden on computer server I/O.

Emerging solutions to many of the current server I/O shortcomings include InfiniBand™ and its predecessor, Next Generation I/O (NGIO) which have been developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "*Next Generation Input/Output (NGIO) Specification*," NGIO Forum on Jul. 20, 1999 and the "*InfiniBand™ Architecture Specification*," the InfiniBand™ Trade Association on Oct. 24, 2000. NGIO/InfiniBand™ introduces the use of an efficient engine that is coupled to host memory which replaces shared buses with a fabric of switchable point-to-point links. This approach decouples the CPU from the I/O subsystem and addresses the problems of reliability, scalability, modular packaging, performance and complexity. Communication between CPU and peripherals occurs asynchronously with the I/O channel engine. The I/O channel engine is utilized to transport data to and from main memory and allow the system bus to act as a switch with point-to-point links capable of near linear scaling with CPU, memory and peripheral performance improvements.

One major challenge to implementing a data network which utilizes an NGIO/InfiniBand™ architecture is to ensure that data messages traverse reliably between a data transmitter (source node) and a data receiver (destination node), via one or more given transmission links, and that there is no loss of data messages due to overflow/underflow.

Since NGIO/InfiniBand™ is an emerging technology not yet in the marketplace, there is no known interface mechanism specifically implemented for NGIO/InfiniBand™ applications. There is no known network interface card (NIC) for a host system (source or destination node) to connect to a data network using a channel-based, switched fabric architecture to support data transfers between communication devices installed at a host system (source or destination node) or between host systems (source and destination nodes) or via a data network. Existing network interface cards (NICs) for host systems are not adapted for emerging NGIO/InfiniBand™ interconnect technology. Likewise, traditional flow control schemes which regulate the flow of data messages in existing data networks are not optimized for NGIO/InfiniBand™ functionality Accordingly, there is a need for an efficient link level flow control mechanism installed at a network fabric node to prevent loss of data packets due to receive buffer overflow at either end of a transmission link (a full duplex transmission path between any two network fabric nodes, such as channel adapters) in a data network for NGIO/InfiniBand™ applications.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIGS. 3A–3C illustrate different data packet formats of data messages transmitted from a source node (data transmitter) to a destination node (data receiver) in an example data network according to an embodiment of the present invention;

DETAILED DESCRIPTION

The embodiments of the present invention are applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™, Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
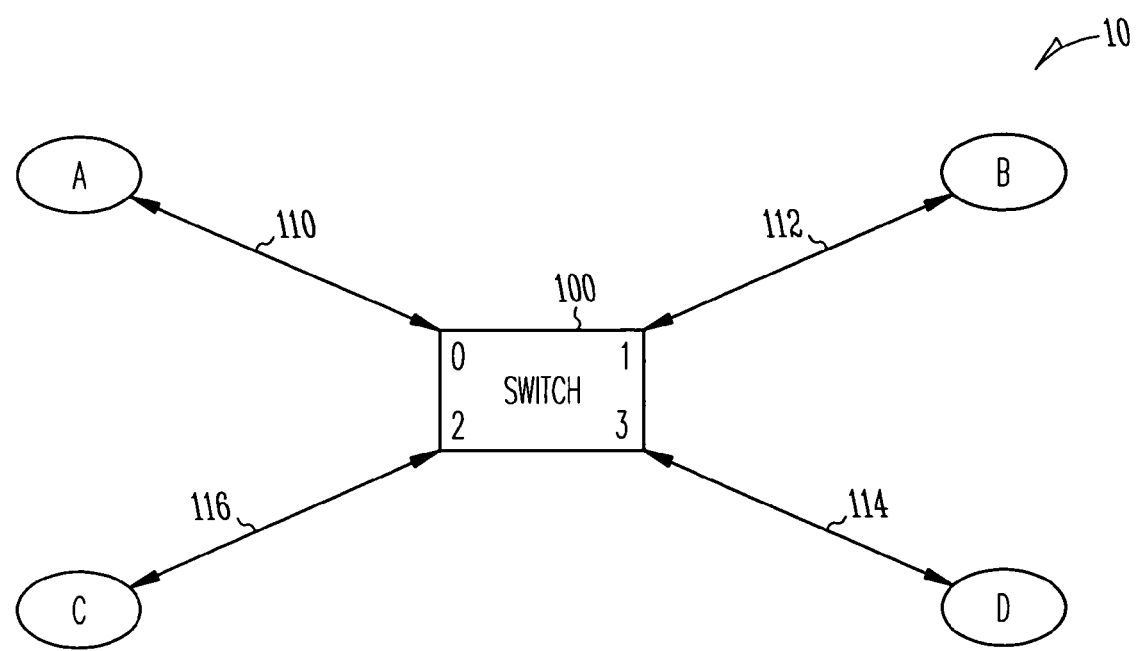
FIG. 1 illustrates a simple data network having several interconnected nodes for data communications according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bidirectional communication path for allowing commands and data messages to flow between two connected nodes (e.g., host systems, switch/switch elements, and I/O units) within the network.

Each channel may refer to a single point-to-point connection where data messages may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000. According to the NGIO/InfiniBand™ specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric (channel) adapters provided to interface endpoints to the NGIO/InfiniBand™ switched fabric, and may be implemented in compliance with the "*Next Generation I/O Link Architecture Specification: HCA Specification, Revision 1.0*", and the "*InfiniBand™ Architecture Specification*" for enabling the endpoints (nodes) to communicate to each other over an NGIO/InfiniBand™ channel(s) with minimum data transfer rates of up to 2.5 gigabit per second (Gbps), for example.

Figure 2:
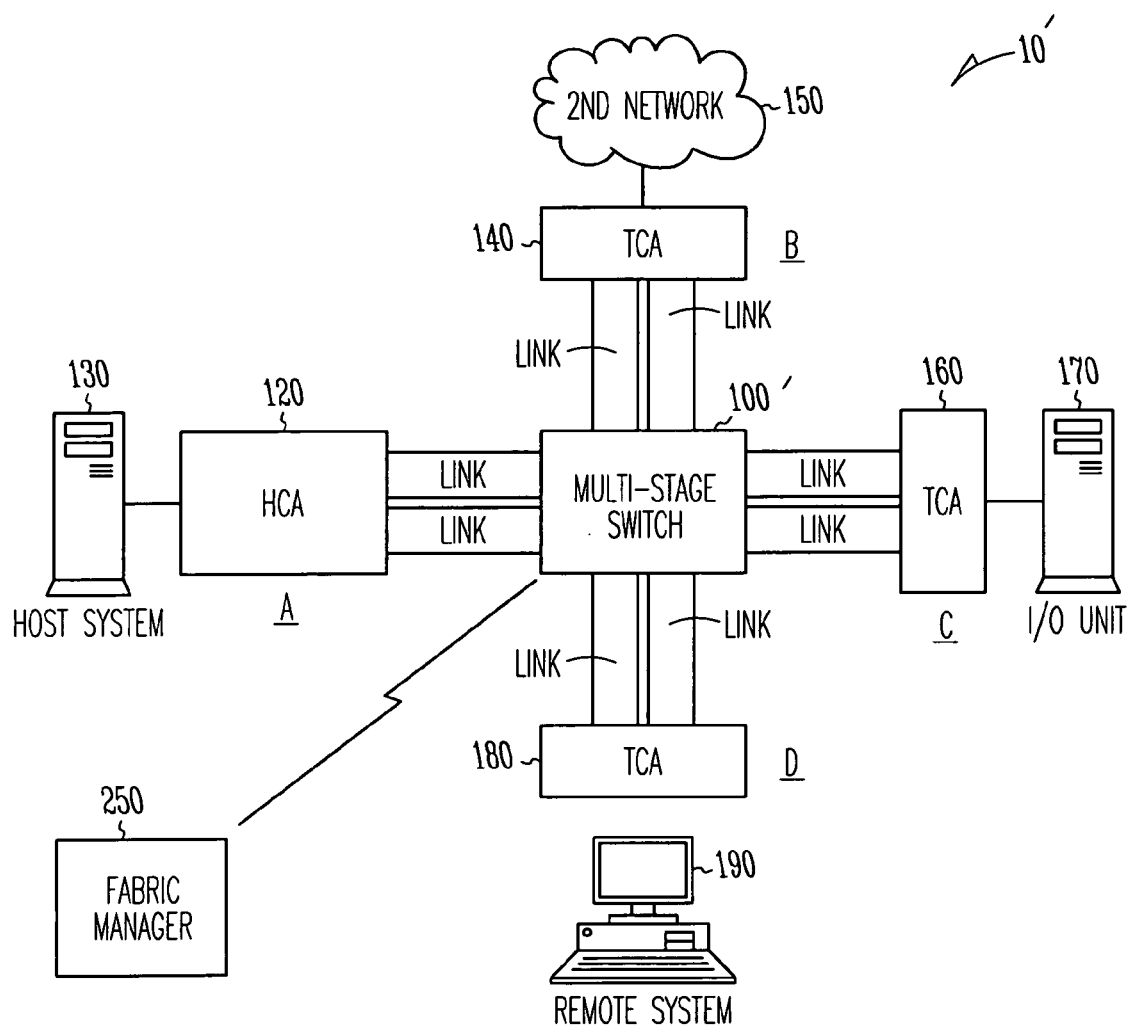
FIG. 2 illustrates another example data network having several nodes interconnected by corresponding links of a multi-stage switched fabric according to an embodiment of the present invention.

For example, FIG. 2 illustrates an example data network (i.e., system area network "SAN") 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow respective queue pairs (QPs) at source and destination endpoints (e.g., host and remote systems, and 10 units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data messages between the host system and any one of the remote systems. In addition, any number of end stations, switches and links may be used for relaying data messages in groups of packets between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fiber channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of the host system 130, the second network 150, the I/O unit 170, or the remote system 190 for managing all network management functions. In either situation, the fabric manager 250 may be a software module configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIG/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "Next Generation I/O Link Architecture Specification: HCA Specification, Revision 1.0" and the "InfiniBand™ Architecture Specification" for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the embodiments of the present invention may be applicable to a wide variety of any number of data networks, hosts and 110 units. For example, practice of the embodiments of the invention may also be made with Future Input/Output (FIG). FIG. specifications have not yet been released, owing to subsequent merger agreement of NGIO and FIG. factions combine efforts on InfiniBand™ Architecture specifications as set forth by the InfiniBand Trade Association (formed August 27, 1999) having an Internet address of "http://www.InfiniBandta.org."

FIGS. 3A–3C illustrate an example packet format of message data transmitted from a source node (data transmitter) to a destination node (data receiver) through switches and/or intermediate nodes according to the "InfiniBand™ Architecture Specification" as set forth by the InfiniBand™ Trade Association on Oct. 24, 2000. As shown in FIG. 3A, a message data 300 may represent a sequence of one or more data packets 310 (typically derived from data transfer size defined by a work request). Each packet 310 may include header information 312, variable format packet payload 314 and cyclic redundancy check (CRC) information 316. Under the "Next Generation Input/Output (NGIO) Specification" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, as shown in FIG. 3B, different types of headers such as, for example, a local routing header 320, a global routing header 322, a base transport header 324 and extended transport headers including a data extended transport header 326, a RDMA extended transport header 328, and an Atomic extended transport header 330 each of which contains functions as specified pursuant to the "InfiniBand™ Architecture Specification".

The local routing header 320 contains fields used for local routing by switches within the example data network 10' shown in FIG. 2. For example, the local routing header 320 may include, but not limited to, a virtual lane (VL) field used to identify the virtual lane (VL) that the packet is using, a link version field used to identify the InfiniBand™ link level protocols, a destination local ID field used to identify the destination port and data path in the data network 10'; a packet length field used to identify the size of the data packet 310; and a source local ID used to identify the source port (injection point).

The global routing header 322 contains fields used for routing data packets 310 between nodes of the example data network 10' shown in FIG. 2. For example, the global routing header 322 may include, but not limited to, a traffic class field used for communication with global service level; a payload length field used to indicate the length of the packet in bytes; a source GID field used to identify the global identifier (GID) for the port which injected the packet into the data network 10'; and a destination GID field used to identify the GID for the port which will consume the packet from the data network 10'.

The base transport header 324 contains fields used for data message transports within the data network 10' shown in FIG. 2. For example, the base transport header 324 may include, but not limited to, an OpCode field used to indicate the packet type, identify if the packet is the first, last, immediate or only packet of a data message and specifies the data transfer operation (such as a send operation or a remote direct memory access "RDMA" write/read); a destination QP field used to indicate the Queue Pair (QP) number at the destination; a packet sequence number (PSN) field used to detect a missing or duplicate packet.

The data extended transport header 326 contains additional transport fields for datagram service. For example, the data extended transport header 326 may include, but not limited to, a Queue Key field used to authorize access to the receive queue; and a source QP field used to indicate the QP number at the source.

The RDMA extended transport header 328 contains additional transport fields for remote direct memory access "RDMA" operations. For example, the RDMA extended transport header 328 may include, but not limited to, a virtual address (VA) field used to provide the virtual address of the RDMA operation; a remote key field used to authorize access for the RDMA operation; and a length field used to indicate the length (in bytes) for the direct memory access operation.

The Atomic extended transport header 330 contains additional transport fields for atomic packets and atomic operations, including: a virtual address (VA) field used to provide the remote virtual address, a remote key field used to authorize access to the remote virtual address; and a swap and compare data field used to provide operands in atomic operations.

The cyclic redundancy check (CRC) information 316 may be variant or invariant. Invariant CRC (ICRC) covers the fields that do not change in a message from a source node to a destination node. Variant CRC (VCRC) covers the fields that can change from link to link.

Signaling protocols for NGIO/InfiniBand™ links may be utilized to implement packet delimiters, ordered-set delimiters, packing padding, and clock tolerance compensation between source and destination. Specifically, control symbols and ordered-sets of control and data symbols according to the InfiniBand™ specification may be utilized for signaling the beginning and end of a data packet 310 and for the gap between data packets 310, and code groups for controlling the flow of data packets 310 across the link, including packet padding and clock tolerance compensation. For example, Start of Data Packet Delimiter (SDP) symbol may be used to identify the start of a data packet 310. Start of Link Packet Delimiter (SLP) symbol may be used to identify the start of a link packet 340 which is used to contain necessary information to advertise current capacity to store data packets 310 and recover lost credits due to errors occurring during data packet transmission. End of Good Packet Delimiter (EGP) symbol may be used to mark the end of each packet as it is transmitted by the originating port. End of Bad Packet Delimiter (EBD) symbol may be used to mark the end of a bad packet forwarded by a switch or a router node. Other inter-packet flow control sequences such as comma character and associated flow control character, and IDLE characters may be taken into account to determine the maximum defined period between IDLE characters.

In addition, link packets may be utilized to train and maintain link operation between a source node (data transmitter) and a destination node (data receiver), via any switches and/or intermediate nodes. However, the challenge remains with using link packets in such a way to convey flow control credits, including information to advertise current capacity to store data packets 310 and to recover lost credits due to errors occurring during data packet transmission.

FIG. 3C illustrates an example link packet according an embodiment of the present invention. According to the InfiniBand™ specification, each link packet 340 may contain several flow control packet fields, including an operand (OP) field 342, a Flow Control Total Block Sent (FCTBS) field 344, a Virtual Lane 346, a Flow Control Credit Limit (FCCL) field 348, and a Link Packet Cyclic Redundancy Check (LPCRC) 350. The Op field 342 may contain 4 bits exhibiting either a value of "0x0" which indicates a normal flow control link packet or a value of "0x1" which indicates a flow control initialization link packet. The Flow Control Total Block Sent (FCTBS) field 344 may contain 12 bits which are generated by the transmitter side logic and set to the total number of blocks (64 bytes) transmitted since link initialization. The Flow Control Credit Limit (FCCL) field 348 may contain 12 bits which are generated by the receiver side logic and used to grant transmission credits to the remote transmitter. The FCCL calculation is based on the current available receive buffer space and the Actual Blocks Received (ABR) counter maintained for each virtual lane at the receiver. The VL field 346 may contain 4 bits which are set to the virtual lane (VL) to which the FCTBS field 344 and the FCCL field 348 apply. The Link Packet Cyclic Redundancy Check (LPCRC) 350 may contain 2 bytes which specify a cyclic redundancy code to cover all fields of the link packet 340. The FCTBS field 344 and the FCCL field 348 of a link packet are used to guarantee that data is never lost due to lack of receive buffer at each end of a link. Link packets 340 are transmitted on a per VL basis in order to limit traffic (based on current buffer capacity) per VL, not per port.

Figure 4A:
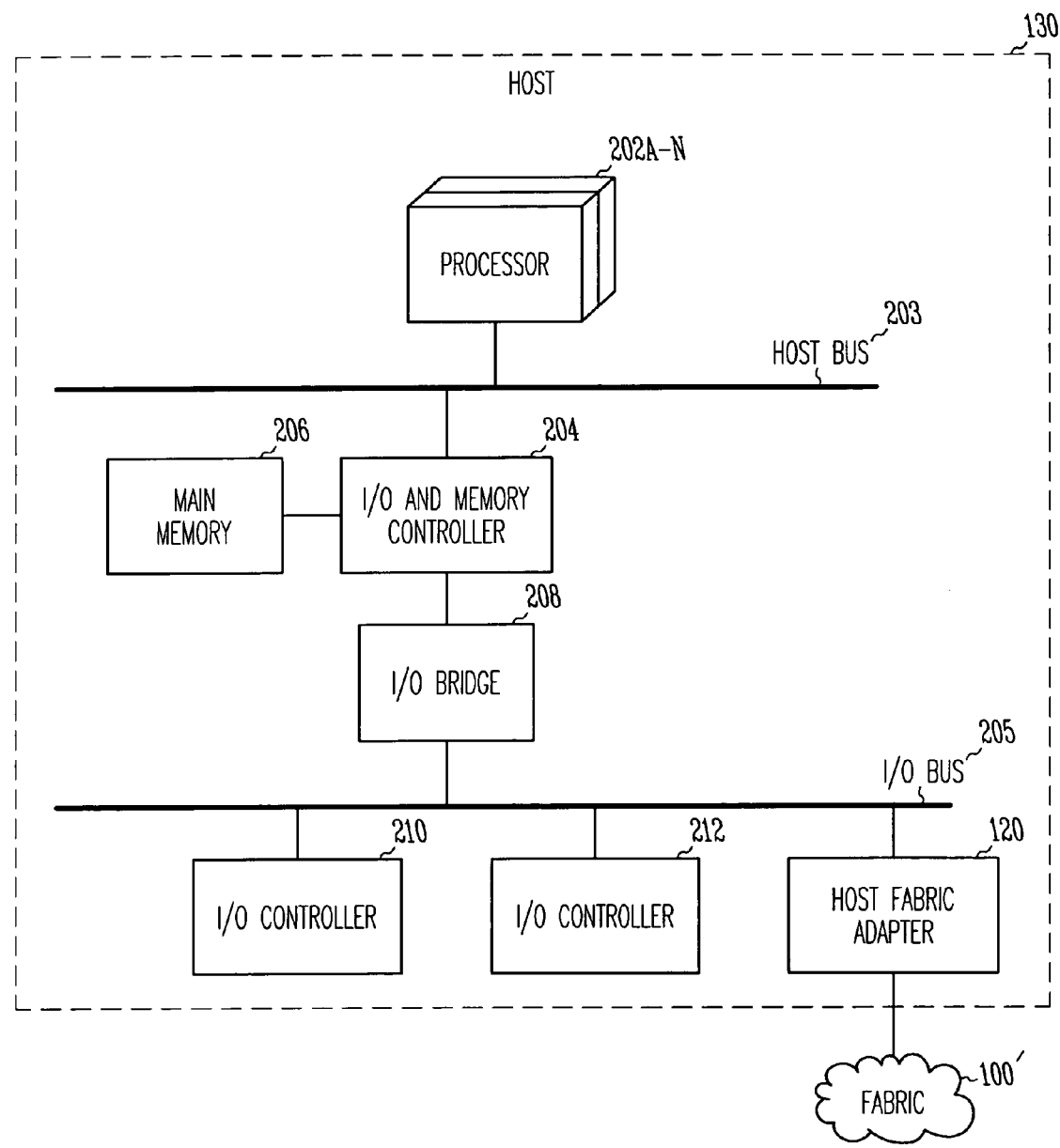
FIGS. 4A–4B illustrate a block diagram of an example host system of an example data network according to an embodiment of the present invention.

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4B:
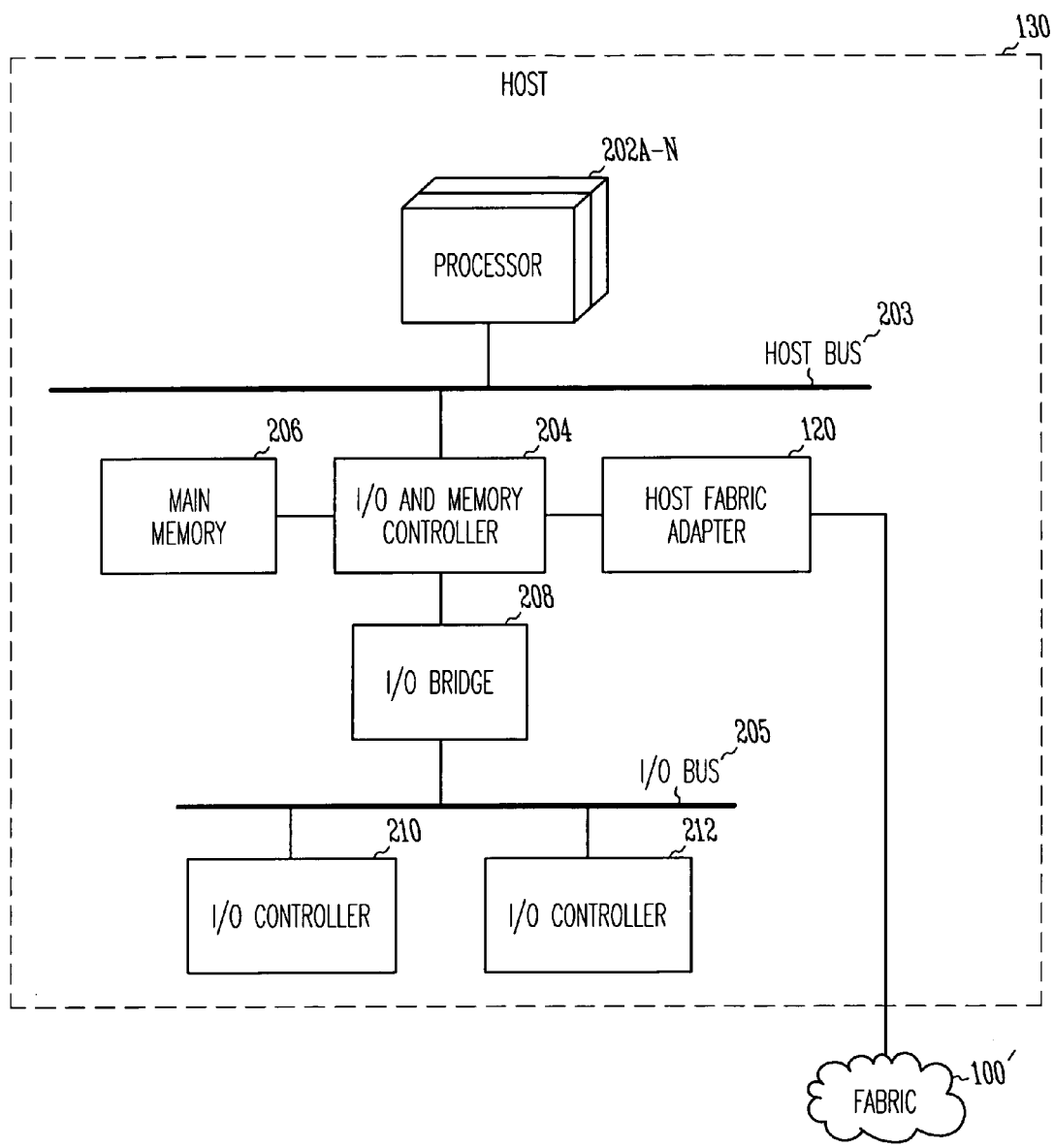

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO/InfiniBand™ switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the NGIO/InfiniBand™ switched fabric 100', while preferably being compatible with many currently available operating systems, such as Windows 2000. More specifically, the software driver module may be installed at the host-fabric adapter 120 to establish communication with a remote system (e.g., I/O controller), and perform functions such as host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such a host software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a host software module may also be bundled with the existing operating system (OS) which may be activated by a particular device driver.

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture*

Specification, Version 1.0," as set forth by Compaq Corp., Intel Corp., and Microsoft Corp., on Dec. 16, 1997. VI architecture comprises four basic components: Virtual Interface (VI) in which work requests are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. However, other architectures may also be used to implement the present invention.

Figure 5:
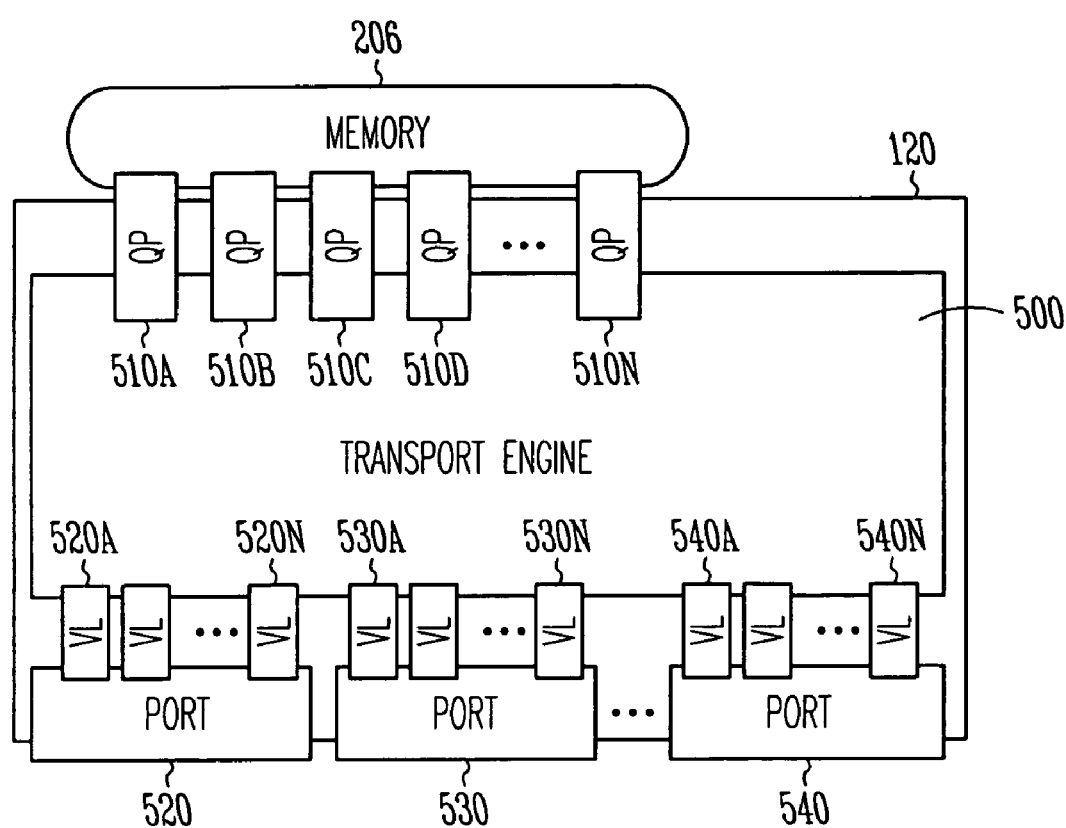
FIG. 5 illustrates an example channel adapter (CA) installed at a source or destination node for generating and consuming data packets according to an embodiment of the present invention.

FIG. 5 illustrates an example host-fabric adapter 120 installed in a host system to support data transfers via a NGIO/InfiniBand™ switched fabric 100'. The host-fabric adapter 120 has a programmable transport engine 500 supporting a number of queue pairs (QPs) 510A–510N in which work requests may be posted to describe data movement operation and location of data to be moved for processing and/or transportation via a switched fabric 100'. All queue pairs (QPs) may share physical ports 520–540 into a switched fabric 100'. Each queue pair (QP) includes a send queue ("SQ" for outbound requests) served as an "initiator" which requests, for example, normal message sends to remote VIs, remote direct memory access "RDMA" reads which request messages to be read from specific memory locations of a target system, via a switched fabric 100', and remote direct memory access "RDMA" writes which request messages to be written onto specific memory locations of a target system, via a switched fabric 100'; and a receive queue ("RQ" for inbound requests) served as a "responder" which receives requests for messages from normal sends, RDMA reads and RDMA writes from a target system, via a switched fabric 100'.

The host-fabric adapter 120 may also have multiple ports 520–540 to access the NGIO/InfiniBand™ switched fabric 100'. Each port may be assigned a local ID (LID) or a range of LIDs. Each port has its own set of transmit and receive buffers (FIFOs) such that each port is capable of sending and receiving data messages concurrently. Buffering may be channeled through respective virtual lanes (VL) 520A–520N, 530A–530N and 540A–540N where each VL has its own flow control.

Each host system may serve as a source (initiator) node which initiates a message data transfer (message send operation) or a destination node of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to queue pairs (QPs) 510A–510N associated with a given fabric adapter, one or more channels may be created and effectively managed so that requested operations can be performed. In addition, one or more host-fabric adapters 120 may be advantageously installed at a host system 130 to expand the number of ports available for redundancy and multiple switched fabrics.

Figure 6:
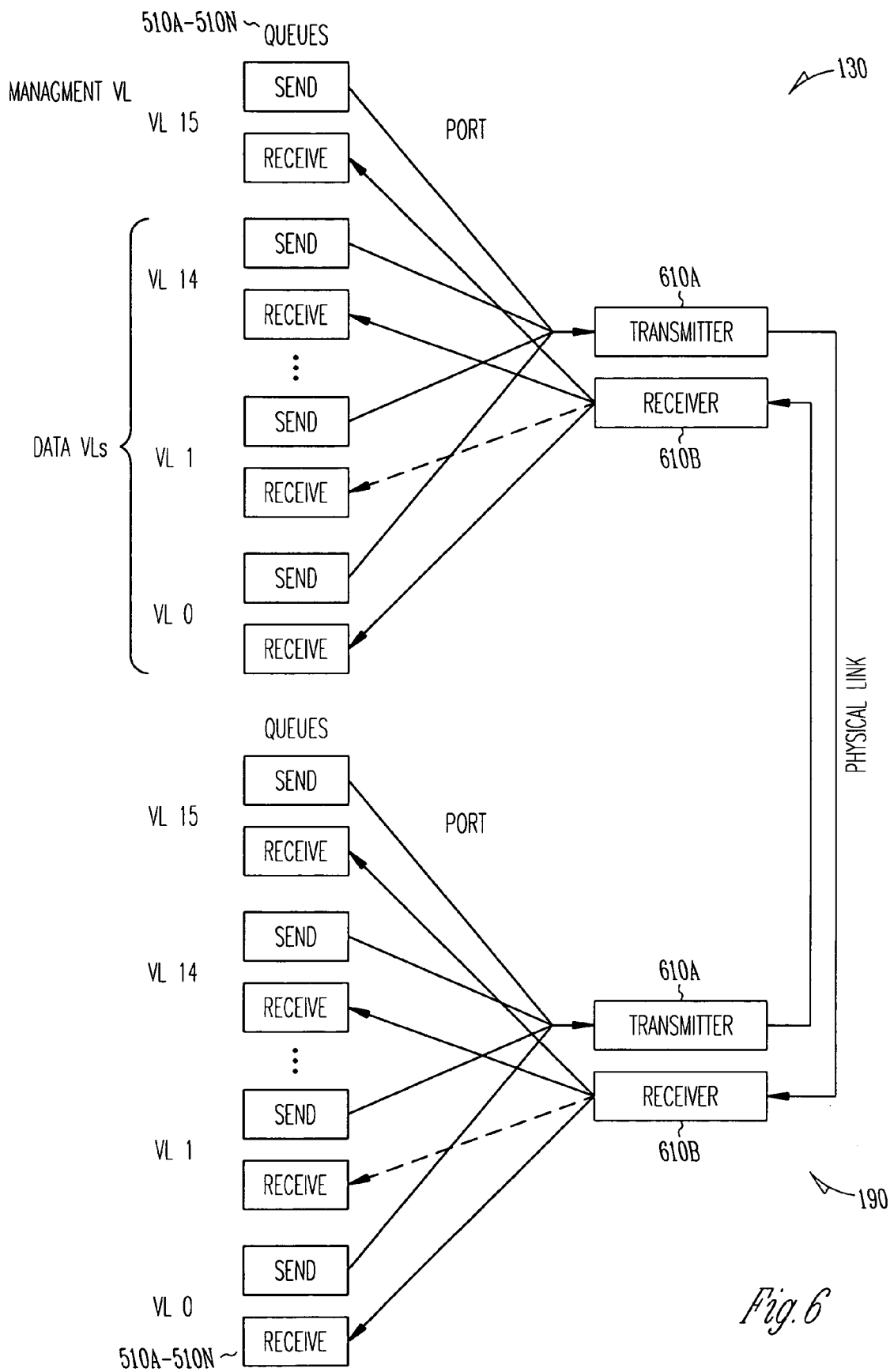
FIG. 6 illustrates an example Virtual Lane (VL) mechanism for creating multiple virtual links within a single physical link between a source node (data transmitter) and a destination node (data receiver) in an example data network according to an embodiment of the present invention.

FIG. 6 illustrates example Virtual Lanes (VL) from a single port to work queue pairs (QPs) 510A–510N at respective end node (host system 130 and target system 190 for example). As shown in FIG. 6, each end of the physical link has a transmitter 610A and a receiver 610B for transmitting and receiving data packets 310, via the NGIO/InfiniBand™ switched fabric 100'. The terms "transmitter" and "receiver" are utilized to describe each end of a given link. The transmitter 610A is the node sourcing data packets 310. The receiver 610B is the consumer of the data packets 310.

Virtual lanes (VLs) provides a mechanism for creating multiple virtual links within a single physical link at a given port. Each virtual lane (VL) represents a set of transmit and receive buffers (FIFOs) in a port. According to the InfiniBand™ specification, each port may contain up to 16 virtual lanes, including VL0–VL14 known as data virtual lanes and VL15 known as management virtual lane which is reserved exclusively for fabric (subnet) management. The actual data VLs that a port uses may be configured by a fabric manager 250 (see FIG. 2) or a similar subnet manager (not shown) if the data network using the NGIO/InfiniBand™ architecture is subdivided into subnets interconnected by routers.

Figure 7:
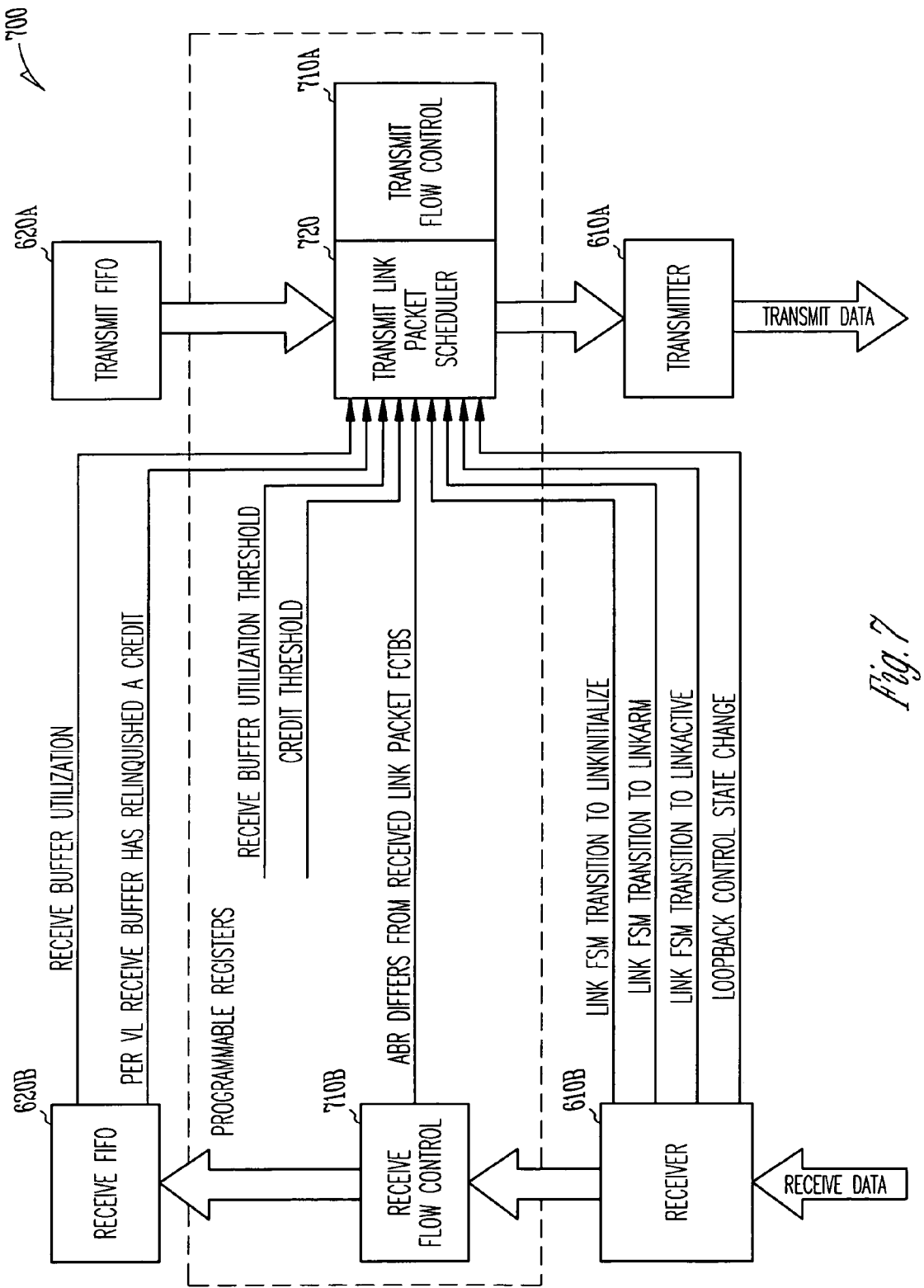
FIG. 7 illustrates an example link level packet flow control mechanism installed at a source or destination node to prevent loss of data packets due to receive buffer overflow at either end of a transmission link according to an embodiment of the present invention.

Turning now to FIG. 7, an example link level flow control mechanism installed to prevent loss of data packets 310 due to receive buffer overflow at either end of a transmission link according to an embodiment of the present invention is illustrated. Unlike many traditional flow control schemes which provide incremental updates that are added to the transmitter available buffer pool, the link level flow control mechanism according to an embodiment of the present invention advantageously utilizes an "absolute" credit based flow control scheme where the receiver 610B on one end of the physical link (remote system 190, for example) provides a "credit limit" indicating the total amount of data that the remote transmitter 610A on the other end of the physical link (host system 130, for example) is authorized to send since link initialization. The remote transmitter 610A (host system 130, for example) does not send data packets 310 unless the receiver 610B (remote system 190, for example) indicates that it has room to accept such data packets 310. This way the corresponding transmitter 610A never transmits data packets 310 in excess of the authorized limit of data packet information.

Periodically, the two nodes (host system 130 and remote system 190) exchange information, via link packets 340, in order to provide additional credits to the remote receiver 610B. Credits are per virtual lane (VL) and indicate the number of data packets 310 that the receiver 610B can accept on that virtual lane (VL). Credits are typically measurement units of a free buffer pool. The buffer pool may be implemented via a N-bit counter used to accumulate free credits. Each credit is defined to be 64-bytes of available receive buffer (FIFO) space. Credits are relinquished, if data packets 310 are removed from the receive buffer (FIFO) or if there is discrepancy from link packets 340 shown in FIG. 3C which are periodically transmitted from the transmitter 610A on one end of the physical link (host system 130, for example) to the receiver 610B on the other end of the physical link (remote system 190, for example).

As described with reference to FIG. 3C, the link packets 340 contain the necessary information to advertise the current buffer (FIFO) capacity for storing data packets 310 and recover lost credits due to errors occurring during data packet transmission. More specifically, the Flow Control Total Bytes Sent (FCTBS) field 344 of each link packet 340 is used to indicate the total number of blocks (64-bytes) transmitted since initialization. The Flow Control Credit Limit (FCCL) field 348 of the same link packet 340 is used to grant transmission credits to the remote transmitter. The FCTBS and FCCL fields 344 and 348 of a link data 340 are used to guarantee that data is never lost due to lack of receive buffer (FIFO) space.

According to the InfiniBand™ specification, there are two rules which regulate the transmission of link packets 340 between opposite end of a physical link:
1. Link (flow control) packets shall be sent for each virtual lane (VL) except VL15 upon entering the LinkInitialize state.
2. When in Port States LinkInitialize, LinkArm or LinkActive, a link packet 340 for a given virtual lane (VL) shall be transmitted prior to the passing of 65,536 symbol times since the last time a link packet 340 for the given virtual lane (VL) was transmitted.

In the LinkInitialize state, the physical link is up and the link layer which handles the sending and receiving of data across the links at the packet level can only receive and transmit link packets 340 and subnet management packets (SMPs). While in this state, the link layer discards all other packets received or presented for transmission.

In the LinkArm state, the physical link is up and the link layer can receive and transmit link packets 340 and SMPs. Additionally, the link layer can receive all other packets but discards all non-SMP data packets presented for transmission.

In the LinkActive state, the physical link is up and the link layer can transmit and receive all packet types.

As shown in FIG. 7, the link level packet flow control mechanism 700 may be incorporated into the port logic block between respective transmitter 610A and receiver 610B and buffer resources, transmit FIFO 620A and receive FIFO 620B in order to control transmission of link packets 340 in order to increase relative link performance. Such a link level packet flow control mechanism 700 may contain a transmit flow control portion 710A which is responsible for scheduling the transmission of link packets 340, via a physical link, and a receive flow control portion 710B which is responsible for providing an indication of Actual Blocks Received (ABR) from the transmitter of the other end of a physical link. The link level packet flow control mechanism 700 utilizes additional criteria to schedule the transmission of flow control link packets 340 on all virtual lanes (VLs) in order to increase relative link performance for the following reasons:
1. The Link State Machine transitions into the LinkInitialize State
2. The Link State Machine transitions into the LinkArm State.
3. The Link State Machine transitions into LinkActive State.
4. The configuration strap for enabling loopback operation changes state.
5. The value of the per VL local FCCL value changes.
6. Per VL symbol time counter indicates that 65,536 symbol times have passed since the last flow control link packet 340 was transmitted for that virtual lane (VL).

However, the transmission of flow control link packets 340 may also be prohibited if the current utilization of the Per-VL receive FIFO 620B exceeds a prescribed amount.

The transmit flow control portion 710A of the link level packet flow control mechanism 700 may contain a Link Packet Scheduler 720 per virtual lane (VL) responsible for tracking the current link state of the corresponding port, (that is, when the Link State Machine transitions into the LinkInitialize, the LinkArm or the LinkActive state, or when the configuration strap for enabling loopback operation changes states) and responsible for constantly monitoring the amount of receive buffer resources on a per VL basis in order to schedule a link packet transmission for that virtual lane (VL).

For example, when the Link State Machine transitions into the LinkInitialize, the Link Packet Scheduler 720 may assert a signal mandating the transmission of an initialization link packet 340 (as opposed to a normal link packet based on the operand, see FIG. 3C) for all virtual lanes (VLs) supported by that port. The link packets 340 may assume the highest transmit priority and proceed to transmit at the inter-packet gap of data packets 310 in order to expedite link configuration. It is plausible that a fabric manager 250 (see FIG. 2) may want to re-configure operational parameters of a given port. Typically operational parameter re-configurations mandate a link retraining. However, since an initialization link packet 340 is transmitted upon the entry into the LinkInitialize, the Link State Machine of a remote node (currently functioning in LinkActive) will receive this link packet 340 and automatically transition into LinkInitialize also. This enables the corresponding flow control counters to remain in synchronization while the fabric manager 250 (see FIG. 2) reconfigures the link without requiring link retraining.

When the Link State Machine transitions into the LinkArm, the Link Packet Scheduler 720 may assert a signal mandating the transmission of a normal link packet 340 for all virtual lanes VLs supported by that port. The link packets 340 may assume the highest transmit priority and proceed to transmit at the inter-packet gap of data packets 310 in order to expedite network configuration. It is also plausible that a device is in the LinkArm state after being configured by the corresponding fabric manager 250 (see FIG. 2). That device is attached to another device currently in the LinkInitialize state, awaiting configuration by the fabric manager 250 (see FIG. 2). Post configuration the fabric manager 250 will transition that node to the LinkArm state also. According to the InfiniBand™ specification, prior to transitioning a node to the LinkActive state, a valid normal link packet MUST have received. Since the subsequent node schedules link packet transmission as soon as it enters the LinkArm state, the connected node which is already in LinkArm will be capable of transitioning to LinkActive immediately. The fabric manager 250 (see FIG. 2) will be able to instruct the initial node (host system 130, for example) to enter the LinkActive state immediately knowing that a valid link packet 340 has already been received (from the remote system 190, for example). This will expedite link configuration by as much as 262 us.

When the Link State Machine transitions to the LinkActive state, the Link Packet Scheduler 720 may force the transmission of a link packet 340 on all corresponding virtual lanes (VLs). This ensures that the connected device, currently operating in the LinkArm state will have received the valid normal link packet 340, required to transition to the LinkActive state as soon as the remote port transitions to LinkActive.

The final port related event that causes flow control link packet transmission is the change of state of the loopback control input. This input defines the current port state operation. When the loopback control state change is active (asserted), the port is functioning in loopback, the transmit data stream is directly connected to the receive data stream. All transmitted packets are received on the port transmitted. When the loopback control state change is inactive (deasserted), the port is functioning as normal, connected to a remote device via the physical link. The benefit is that the port can change mode of operation on the fly. The corresponding port may be connected to a remote device with large receive buffers (FIFO) indicating that it may proceed with packet transmission on any VL. If the port is then instructed to function in a loopback mode, the receive buffer (FIFO) resources per VL may be limited. By sensing this change, the Link Packet Scheduler 720 may assume control of the transmit data stream and force the transmission of initialization link packets 340 at the inter-packet gap boundary in order to ensure the Link state Machine will transition into the LinkInitialize state and clear all counters tracking the remote device's buffer space.

When the receive buffer resources on a per VL basis free up (packets extracted from the receive FIFO 620B), space is assigned to a free buffer pool. The unit of measurement for this pool is credits. A credit is defined to be 64-bytes of available space in the receive FIFO 620B. Each time a credit is relinquished from the receive FIFO 620B, the Flow Control Credit Limit (FCCL) field for that port is incremented to advertise to the remote system 190 (for example) of additional storage capacity.

Credits are relinquished for the following reasons: First, data packets 310 are removed from the receive FIFO 620B and that space is reclaimed as available for data packet storage. Second, link packets 340 are received whose Flow Control Total Bytes Sent (FCTBS) field 344 differs from the ABR counter tracking actual blocks received at the local port. This happens when link integrity problems occur forcing data packets 310 to be inadvertently dropped without storage in the receive FIFO 620B. The difference implies link credits that were consumed by the remote system 190 that did not result in local FIFO utilization. The host system 130 (for example) must inform the remote system 190 of additional buffer (FIFO) capacity by transmitting a link packet 340. The link packet transmission solution must be flexible enough that the link does not become inundated with link packets 340 that may ultimately result in lower network performance. This is achieved by accumulating relinquished credits (either from packet extraction or received link packets 340) in a credit pool (via a counter). The accumulated credits in the counter (see FIG. 9 hereinbelow) are then compared with a programmable link credit threshold. When the accumulated credits exceed this threshold a link packet 340 is scheduled for the corresponding virtual lane VL. Once the link packet 340 is scheduled, the counter is cleared and additional new credits for that VL begin accumulating. The value programmed in the threshold register determines the frequency of link packet transmission and allows for various design tradeoffs. If a local port implements a very shallow receive FIFO 620B, setting the threshold low may result in more link packets 340 transmitted enabling the remote system 190 to process additional data packets 310. Conversely, if a port implements a very deep receive FIFO 620B the threshold may be set higher slowing the transmission of link packets 340 to maximize network utilization with data packets 310. In either case the programmable threshold provides the greatest flexibility.

Each receive FIFO 620B may be equipped with a utilization threshold (via a programmable register) set high enough for multiple data packets pending processing. If the current FIFO utilization (how full it is) exceeds the utilization threshold, link packets 340 may be prohibited from transmission. By delaying credit returns the port is free to process traffic on other underutilized virtual lanes VLs since this virtual lane VL has multiple packets pending processing. As packets are extracted from the receive FIFO 620B the utilization will eventually fall below the programmed utilization threshold and the link packet 340 will be scheduled for transmission on a per VL basis.

The final requirement for link packet transmission is the expiration of the Link Packet Watchdog Timer. The Link Packet Watchdog Timer may be reset when a given link packet 340 for a given VL is scheduled for transmission. The Timer may track elapsed symbol times since the link packet 340 was transmitted. If 65,536 symbol times have elapsed since the transmission of the last link packet 340, the timer may mandate the Link Packet Scheduler 720 to transmit a link packet 340 on that virtual lane VL. If for any other reason a link packet 340 is transmitted, the Link Packet Watchdog Timer may be cleared respectively. This timer expiration mandates the transmission of a link packet 340 and thus pre-empts the per-VL Link Packet Scheduler mechanisms employed.

Figure 8:
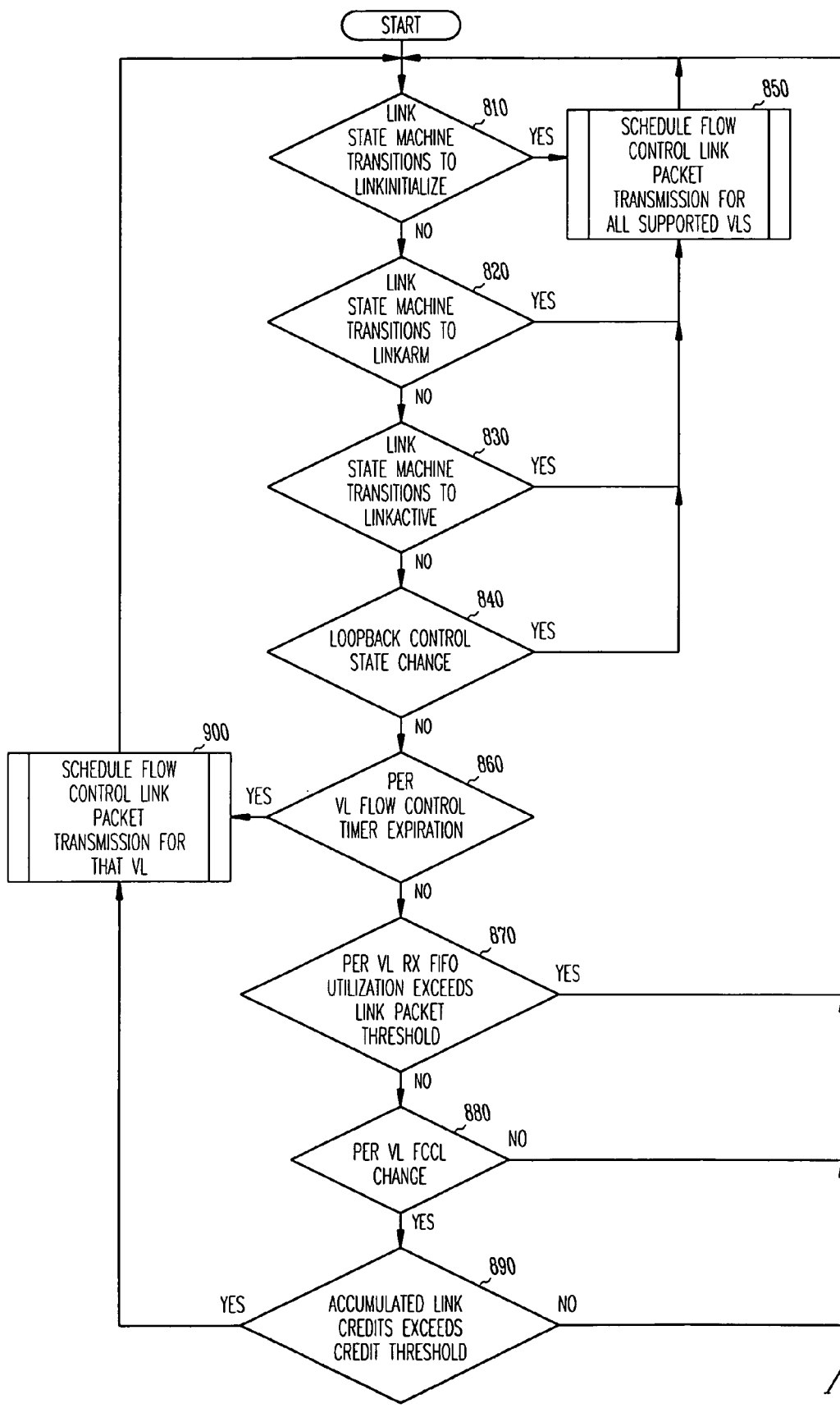
FIG. 8 illustrates an example flow control transmission algorithm of an example transmit flow control mechanism according to an embodiment of the present invention.

FIG. 8 illustrates an example flow control transmission algorithm implemented by the transmit flow control mechanism 710A according to an embodiment of the present invention. The flow control transmission algorithm deciphers when it is necessary to transmit a link packet 340 on all supported data Virtual Lanes (VLs) on a given port. This occurs when events specific to the given port occur such as Link State Machine and Loopback state changes. Independent of port events, the Per-VL Link Packet Scheduler mechanisms will schedule a single link packet 340, corresponding to that VL to be transmitted if required.

As shown in FIG. 8, when the Link State Machine transitions into the LinkInitialize state at block 810, the LinkArm state at block 820 or the LinkActive state at block 830, or when the configuration strap for enabling loopback operation changes states at block 840, a link packet transmission is scheduled for all supported virtual lanes (VLs) on a given port at block 850.

However, if the Link State Machine does not transition into the LinkInitialize state at block 810, the LinkArm state at block 820 or the LinkActive state at block 830, and if there is no loopback control state change at block 840, a determination is made as to whether the Link Packet Watchdog Timer per VL has expired at block 860. The Link Packet Watchdog Timer is utilized to ensure that at minimum link packets 340 will be independently scheduled at least once every 65,536 symbol times in accordance with the InfiniBand™ specification. If the per VL Link Packet Watchdog Timer has not expired, then a determination is made as to whether the per VL receive FIFO utilization exceeds a link packet threshold (receive FIFO utilization threshold) at block 870. If the receive FIFO utilization exceeds a link packet threshold (receive FIFO utilization threshold), then the link packets 340 are prohibited from transmission. However, if the receive FIFO utilization does not exceed the link packet threshold (receive FIFO utilization threshold), a determination is made as to whether has there been any per VL FCCL (Flow Control Credit Limit) change at block 880.

The FCCL (Flow Control Credit Limit) for the port is incremented (i.e., changed) to advertise to the remote system 190 of additional storage capacity, each time a credit (64-bytes) is relinquished from the receive FIFO 620B. Credits may be relinquished when data packets 310 are removed from the receive FIFO 620B and that space is reclaimed as available for packet storage, or when link packets 340 are received whose FCTBS (Flow Control Total Bytes Sent) field differs from the ABR counter tracking actual blocks received ABR at local port.

If there been any FCCL (Flow Control Credit Limit) change, a determination is made as to whether the accumulated credits (either from packet extraction or received link packets 340) in a credit pool (via a counter) exceed a programmable link credit threshold at block 890. When the accumulated free credits exceed the programmable credit threshold (count value>programmed credit threshold), a link packet transmission is scheduled for the corresponding virtual lane VL at block 900.

Independently, if the per VL Link Packet Watchdog Timer has expired at block 860, the link packet transmission is also scheduled for the corresponding virtual lane VL at block 900. The Link Packet Watchdog Timer may be expired at any time in order to ensure that at minimum link packets 340 will be scheduled at least once every 65,536 symbol times in accordance with the InfiniBand™ specification.

Figure 9:
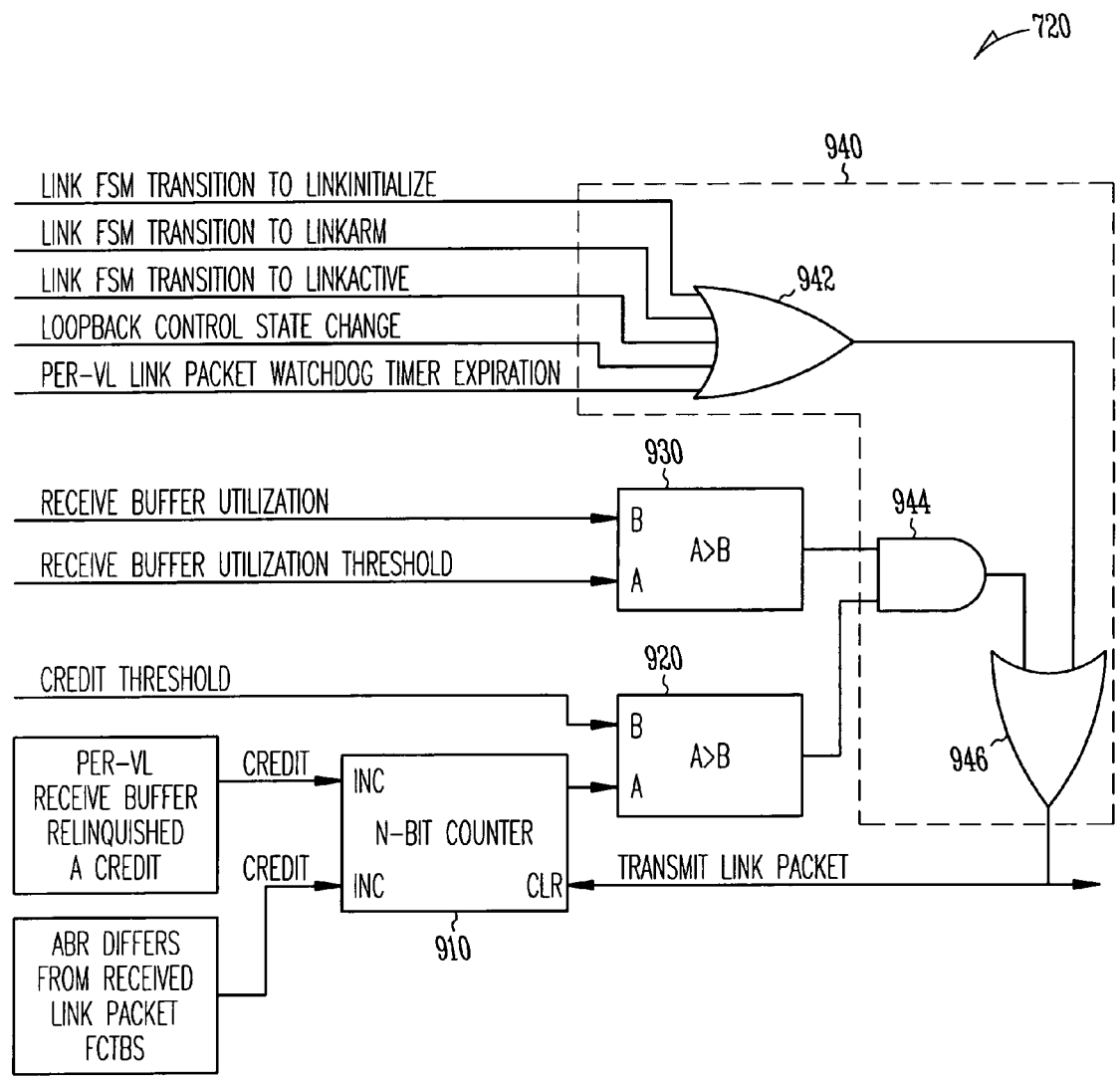
FIG. 9 illustrates an example hardware implementation of a Link Packet Scheduler according to an embodiment of the present invention.

Refer now to FIG. 9, an example hardware implementation of the per VL Link Packet Scheduler 720 according to an embodiment of the present invention is illustrated. As shown in FIG. 9, the Link Packet Scheduler 720 for each virtual lane VL comprises several logic blocks including a N-bit counter 910, comparators 920 and 930, and a logic device 940 implemented to track the current link state of the corresponding port, monitor the amount of receive buffer resources on a per virtual lane VL basis and schedule for a link packet transmission in order to increase relative link performance.

As shown in FIG. 9, the N-bit counter 910 may be a 12-bit return credit accumulation counter maintained for each virtual lane VL at the receiver 610B to accumulate free credits relinquished, when a data packet is removed from a receive buffer and that buffer space is reclaimed as available for data packet storage, or when a link packet is received whose Flow Control Total Bytes Sent (FCTBS) field differs from actual blocks received (ABR) at the given port.

The first comparator 920 is arranged to make comparison between accumulated free credits "A" from the N-bit counter 910 and a programmable credit threshold "B". When the accumulated free credit "A" is greater than the programmable credit threshold "B" (count value>programmed credit threshold), the first comparator 920 generates a logic "1" output.

The second comparator 930 is arranged to make comparison between a current receive buffer (FIFO) utilization "B" indicating a data storage level of the receive buffer 610B and a programmable (receive buffer) utilization threshold "A". When the programmable utilization threshold "A" is greater than the current buffer (FIFO) utilization "B", the second comparator 930 generates a logic "1" output.

The logic device 940 is arranged to track a current link state of the corresponding port, to monitor the amount of receive buffer resources from the first comparator 920 and the second comparator 930 and to schedule for the transmission of a link packet, via a physical link.

The logic device 940 may comprise a first OR gate 942, an AND gate 944 and a second OR gate 946. The first OR gate 942 is arranged to track whether the Link State Machine transitions into one of the LinkInitialize, the LinkArm and the LinkActive state, whether the configuration strap for enabling loopback operation changes states, and whether the per-VL Link Packet Watchdog Timer expires at least every 65,536 symbol times. If any of these higher priority conditions is met as described with reference to FIG. 8, the first OR gate 942 generates a logic "1" output.

The AND gate 944 is arranged to logically combine outputs of the first comparator 920 and the second comparator 930, and to produce the logic "1" output, if both the first comparator 920 and the second comparator 930 send a true condition to the second OR gate 946 so as to schedule the link pack transmission for the corresponding virtual lane (VL) on the given port.

The second OR gate 946 is arranged to logically combine the logic signals from the first OR gate 942 and the AND gate 944, and to produce an indication for transmission of the link packet for the virtual lane (VL) on the given port to prevent loss of data packets due to receive buffer (FIFO) overflow at either end of the physical link.

As described from the foregoing, the present invention advantageously provides a link level packet flow control mechanism installed to prevent loss of data packets due to receive buffer overflow at either end of a transmission link. Unlike many traditional flow control schemes which provide incremental updates that are added to the transmitter available buffer pool, the link level packet flow control mechanism according to an embodiment of the present invention advantageously utilizes an "absolute" credit based flow control scheme where the receiver on each physical link sends credits to the transmitter on the other end of the physical link in order to increase network performance. As a result, quicker fabric configuration with less fabric manager involvement is achieved. The link level packet flow control mechanism also enables on the fly loopback transitions. Port can operate in or out of loopback w/o mandating link retraining. Programmable credit acquisition threshold enables credits to be returned as they become available not every 65,536 symbol times which results in a significant network performance increase especially when dealing with shallow receive buffer resources. FIFO utilization threshold throttles link packet transmission since multiple packets pending processing currently exist in the receive buffer which allows the connected node to focus on the least utilized virtual lanes VLs. Also, the link level packet flow control mechanism provides greatest flexibility by allowing programmable thresholds and enables post-silicon performance modeling tailored to maximize network performance per application.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer network as shown in FIGS. 1–2 may be configured differently or employ some or different components than those illustrated. Such computer network may include a local area network (LAN), a wide area network (WAN), a campus area-network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. In addition, the flow control mechanism shown in FIGS. 7–9 may be configured differently or employ some or different components than those illustrated without changing the basic function of the invention. For example, different combinations of logic gates such as AND, OR, NOR, NAND etc. may be used to implement per VL Link Packet Scheduler 720 shown in FIG. 9. Many modifications may be made to adapt the teachings of the embodiments of the present invention to a particular situation without departing from the scope thereof. Therefore, it is intended that the embodiments of the present invention not be limited to the various exemplary embodiments disclosed, but that the embodiments of the present invention include all embodiments falling within the scope of the appended claims.

What is claimed is:

1. A Link Packet Scheduler for each virtual lane (VL) at a given port, comprising:
a N—bit counter arranged to accumulate free credits relinquished, when a data packet is removed from a receive buffer and buffer space is reclaimed as available for data packet storage, or when a link packet is received whose Flow Control Total Bytes Sent (FCTBS) field differs from actual blocks received (ABR) at the given port;
a first comparator arranged to make comparison between accumulated free credits from the N—bit counter and a programmable credit threshold;
a second comparator arranged to make comparison between a current buffer receive utilization indicating a data storage level of the receive buffer and a programmable utilization threshold; and
a logic device arranged to track a current link state of a corresponding port, to monitor amount of receive buffer resources from the first and second comparators and to schedule a link packet transmission, via a physical link.

2. The Link Packet Scheduler as claimed in claim 1, wherein said logic device comprises:
a first OR gate arranged to track whether a Link State Machine transitions into one of a LinkInitialize, a LinkArm and a LinkActive state, whether a configuration strap for enabling loopback operation changes states, and whether a per—VL Link Packet Watchdog Timer expires, and generate therefrom a logic signal;
an AND gate arranged to logically combine outputs of the first comparator and the second comparator and produce another logic signal; and
a second OR gate arranged to logically combine the logic signals from the first OR gate and the AND gate and generate an indication for the link packet transmission for the virtual lane (VL) on the given port.

3. The Link Packet Scheduler as claimed in claim 2, wherein said Link Packet Watchdog Timer is utilized to ensure that at minimum link packets will be independently scheduled at least once every 65,536 symbol times in accordance with InfiniBand™ specification.

4. The Link Packet Scheduler as claimed in claim 1, wherein each of said credits is defined to be 64—bytes of available receive buffer space.

5. The Link Packet Scheduler as claimed in claim 1, wherein said link packet contains at least a Flow Control Total Block Sent (FCTBS) field which is generated by a transmitter logic and is set to a total number of blocks (64 bytes) transmitted since link initialization, and a Flow Control Credit Limit (FCCL) field which is generated by receiver logic and is used to grant transmission credits to a remote transmitter.

6. The Link Packet Scheduler as claimed in claim 5, wherein said Flow Control Total Block Sent (FCTBS) field and said Flow Control Credit Limit (FCCL) field are used to guarantee that data is never lost due to lack of said receive buffer at the end of the physical link.

7. The Link Packet Scheduler as claimed in claim 1, wherein said programmable utilization threshold is set such that the receive buffer has multiple data packets pending processing.

8. A data network, comprising:
a host system having a host—fabric adapter;
at least one remote system;
a switch fabric which interconnects said host system via said host—fabric adapter to said at least one remote system along different physical links for data communications; and
one or more communication ports provided in said host—fabric adapter of said host system, each port including a set of transmit and receive buffers to send and receive data packets concurrently via respective transmitter and receiver at an end of a physical link, via said switched fabric, and a flow control mechanism utilized to prevent loss of data due to receive buffer overflow at the end of said physical link, said flow control mechanism including a N—bit counter arranged to accumulate free credits relinquished, when a data packet is removed from a receive buffer and buffer space is reclaimed as available for data packet storage, or when a link packet is received whose Flow Control Total Bytes Sent (FCTBS) field differs from actual blocks received (ABR) at a given port, a first comparator arranged to make comparison between accumulated free credits from the N—bit counter and a programmable credit threshold, a second comparator arranged to make comparison between a current buffer receive utilization indicating a data storage level of the receive buffer and a programmable utilization threshold, and a logic device arranged to track a current link state of a corresponding port, to monitor the amount of receive buffer resources from the first and second comparators and to schedule a link packet transmission, via the physical link.

9. The data network as claimed in claim 8, wherein said flow control mechanism is arranged to schedule the link packet transmission in accordance with InfiniBand™ specification.

10. A data network, comprising:
a host system having a host—fabric adapter;
at least one remote system;
a switch fabric which interconnects said host system via said host—fabric adapter to said at least one remote system along different physical links for data communications; and
one or more communication ports provided in said host—fabric adapter of said host systems, each port including a set of transmit and receive buffers to send and receive data packets concurrently via respective transmitter and receiver at an end of a physical link, via said switched fabric, and a flow control mechanism utilized to prevent loss of data due to receive buffer overflow at the end of said physical link, wherein said flow control mechanism is configured to support flow control through multiple virtual lanes (VLs) on a given port and to perform:
determining when a Link State Machine transitions into one of a LinkInitialize state, a LinkArm state and a LinkActive state, or when a configuration strap for enabling loopback operation changes states;
if the Link State Machine transitions into one of the LinkInitialize state, the LinkArm state and the LinkActive state, or when the configuration strap for enabling loopback operation changes states, scheduling a link packet transmission for all supported virtual lanes (VLs) on the given port;
if the Link State Machine does not transition into one of the LinkInitialize state, the LinkArm state and the LinkActive state, or when the configuration strap for enabling loopback operation does not change states, determining whether a Link Packet Watchdog Timer per virtual lane (VL) has expired;

if the per VL Link Packet Watchdog Timer has expired, scheduling a link packet transmission for a virtual lane (VL) corresponding to said timer;

if the per VL Link Packet Watchdog Timer has not expired, determining whether a receive buffer utilization indicating a data storage level of the receive buffer exceeds a programmable utilization threshold;

if the receive buffer utilization exceeds the programmable utilization threshold, prohibiting the link packet transmission for that virtual lane (VL);

if the receive buffer utilization does not exceed the programmable utilization threshold, determining whether free credits accumulated exceeds a programmable credit threshold;

if the free credits accumulated exceeds the programmable credit threshold, scheduling the link packet transmission for that virtual lane (VL); and if the free credits accumulated does not exceed the programmable credit threshold, prohibiting the link packet transmission for that virtual lane (VL).

11. The data network as claimed in claim 10, wherein each of said credits is 64—bytes from the receive buffer, and said credits are relinquished when data packets are removed from the receive buffer and that space is reclaimed as available for packet storage, or when link packets are received whose Flow Control Total Bytes Sent (FCTBS) fields differ from actual blocks received (ABR) at the given port.

12. A data network, comprising:
a host system having a host—fabric adapter;
at least one remote system;
a switch fabric which interconnects said host system via said host—fabric adapter to said at least one remote system along different physical links for data communications; and
one or more communication ports provided in said host—fabric adapter of said host system, each port including a set of transmit and receive buffers to send and receive data packets concurrently via respective transmitter and receiver at an end of a physical link, via said switched fabric, and a flow control mechanism utilized to prevent loss of data due to receive buffer overflow at the end of said physical link, wherein said flow control mechanism contains a Link Packet Scheduler per virtual lane (VL) arranged to schedule a link packet transmission for a virtual lane (VL) corresponding to said Link Packet Scheduler, wherein said Link Packet Scheduler comprises:
a N—bit counter arranged to accumulate free credits relinquished, when a data packet is removed from a receive buffer and buffer space is reclaimed as available for data packet storage, or when a link packet is received whose Flow Control Total Bytes Sent (FCTBS) field differs from actual blocks received (ABR) at a given port;
a first comparator arranged to make comparison between accumulated free credits from the N—bit counter and a programmable credit threshold;
a second comparator arranged to make comparison between a current buffer receive utilization indicating a data storage level of the receive buffer and a programmable utilization threshold; and
a logic device arranged to track a current link state of a corresponding port, to monitor amount of receive buffer resources from the first and second comparators and to schedule the link packet transmission, via the physical link.

13. The data network as claimed in claim 12, wherein said logic device comprises:
a first OR gate arranged to track whether a Link State Machine transitions into one of a LinkInitialize, a LinkArm and a LinkActive state, whether a configuration strap for enabling loopback operation changes states, and whether a per—VL Link Packet Watchdog Timer expires at a predetermined symbol time, and to produce therefrom another logic signal;
an AND gate arranged to logically combine outputs of the first comparator and the second comparator and to produce a logic signal; and
a second OR gate arranged to logically combine the logic signals from the first OR gate and the AND gate and to produce an indication for the link packet transmission for the virtual lane (VL) on the given port.

14. The data network as claimed in claim 12, wherein a Link Packet Watchdog Timer is utilized such that link packets are arranged to be independently scheduled at least once every 65,536 symbol times in accordance with InfiniBand™ specification.

15. The data network as claimed in claim 12, wherein each of said credits is defined to be 64—bytes of available receive buffer space.

16. The data network as claimed in claim 12, wherein said link packet contains at least a Flow Control Total Block Sent (FCTBS) field which is generated by a transmitter logic and is set to a total number of blocks (64 bytes) transmitted since link initialization, and a Flow Control Credit Limit (FCCL) field which is generated by a receiver logic and is used to grant transmission credits to a remote transmitter.

17. The data network as claimed in claim 16, wherein said Flow Control Total Block Sent (FCTBS) field and said Flow Control Credit Limit (FCCL) field are used to guarantee that data is never lost due to lack of said receive buffer at the end of the physical link.

18. The data network as claimed in claim 12, wherein said programmable utilization threshold is set such that the receive buffer has multiple data packets pending processing.

19. A method of flow control of a link packet in a host—fabric adapter installed in a data network, comprising:
determining when a Link State Machine transitions into one of a LinkInitialize state, a LinkArm state and a LinkActive state, or when a configuration strap for enabling loopback operation changes state;
if the Link State Machine transitions into one of the LinkInitialize state, the LinkArm state and the LinkActive state, or when the configuration strap for enabling loopback operation changes states, scheduling transmission of a link packet for all supported virtual lanes (VLs) on a given port;
if the Link State Machine does not transition into one of the LinkInitialize state, the LinkArm state and the LinkActive state, or when the configuration strap for enabling loopback operation does not change states, determining whether a Link Packet Watchdog Timer per virtual lane (VL) has expired;
if the per VL Link Packet Watchdog Timer has expired, scheduling transmission of said link packet for a virtual lane (VL) corresponding to said timer;
if the per VL Link Packet Watchdog Timer has not expired, determining whether a receive buffer utilization indicating a data storage level of a corresponding receive buffer exceeds a programmable utilization threshold;

if the receive buffer utilization exceeds the programmable utilization threshold, prohibiting transmission of the link packet for that virtual lane (VL);

if the receive buffer utilization does not exceed the programmable utilization threshold, determining whether free credits accumulated exceeds a programmable credit threshold;

if the free credits accumulated exceeds the programmable credit threshold, scheduling transmission of the link packet for that virtual lane (VL); and if the free credits accumulated does not exceed the programmable credit threshold, prohibiting transmission of the link packet for that virtual lane (VL).

20. The method as claimed in claim 19, wherein each of said credits is 64—bytes from the receive buffer, and said credits are relinquished when data packets are removed from the receive buffer and space is reclaimed as available for packet storage, or when link packets are received whose Flow Control Total Bytes Sent (FCTBS) fields differ from actual blocks received (ABR) at a given port.

21. The method as claimed in claim 19, wherein said Link Packet Watchdog Timer is utilized such that link packets are arranged to be independently scheduled at least once every 65,536 symbol times in accordance with InfiniBand™ specification.

22. The method as claimed in claim 19, wherein each of said credits is defined to be 64—bytes of available receive buffer space.

23. The method as claimed in claim 19, wherein said link packet contains at least a Flow Control Total Block Sent (FCTBS) field which is generated by a transmitter logic and is set to a total number of blocks (64 bytes) transmitted since link initialization, and a Flow Control Credit Limit (FCCL) field which is generated by a receiver logic and is used to grant transmission credits to a remote transmitter.

24. The method as claimed in claim 19, wherein a Flow Control Total Block Sent (FCTBS) field and a Flow Control Credit Limit (FCCL) field are used to guarantee that data is never lost due to lack of said receive buffer at the end of the physical link.

25. The method as claimed in claim 19, wherein said programmable utilization threshold is set such that the receive buffer has multiple data packets pending processing.

* * * * *